United States Patent Office 2,860,818
Patented Nov. 18, 1958

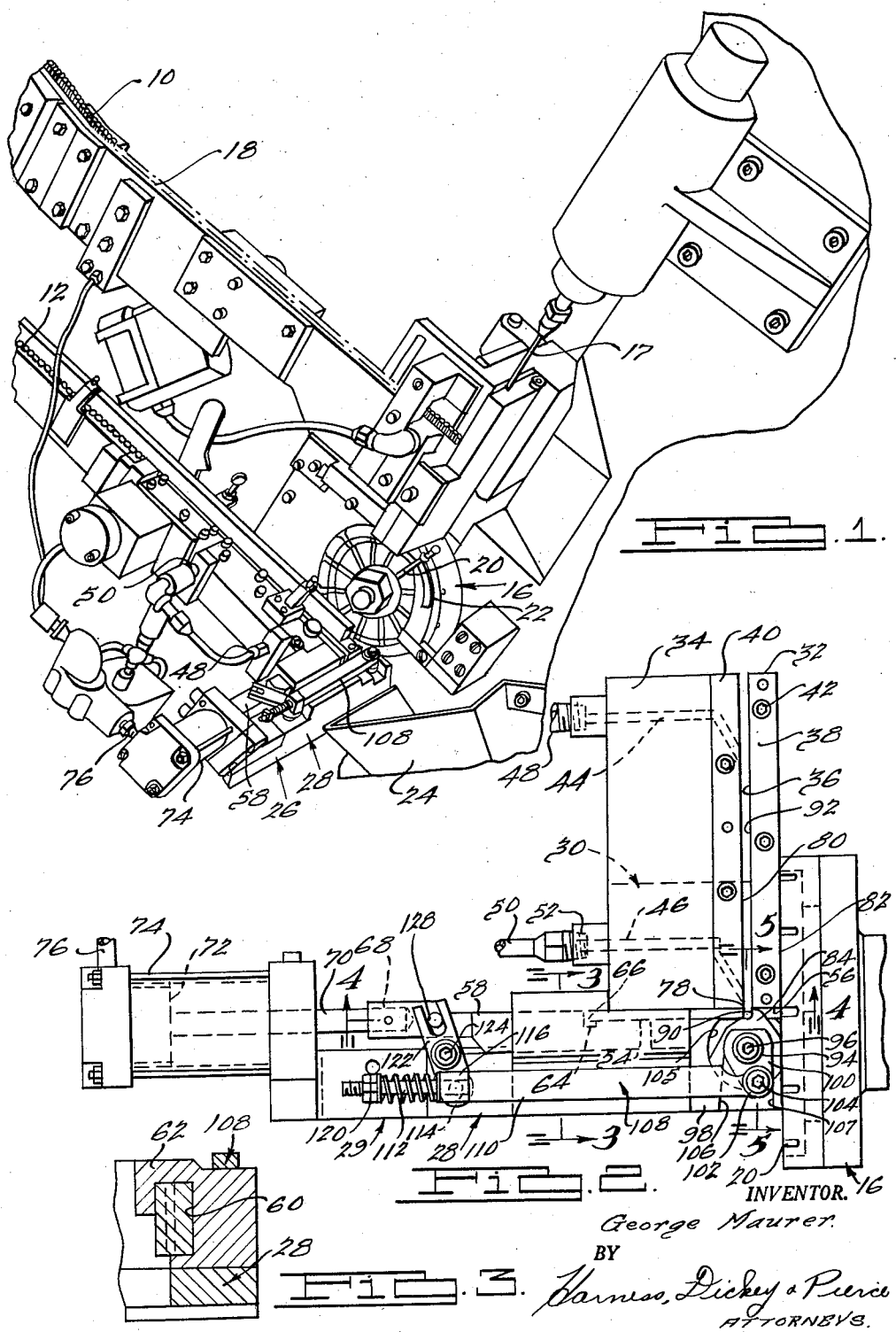

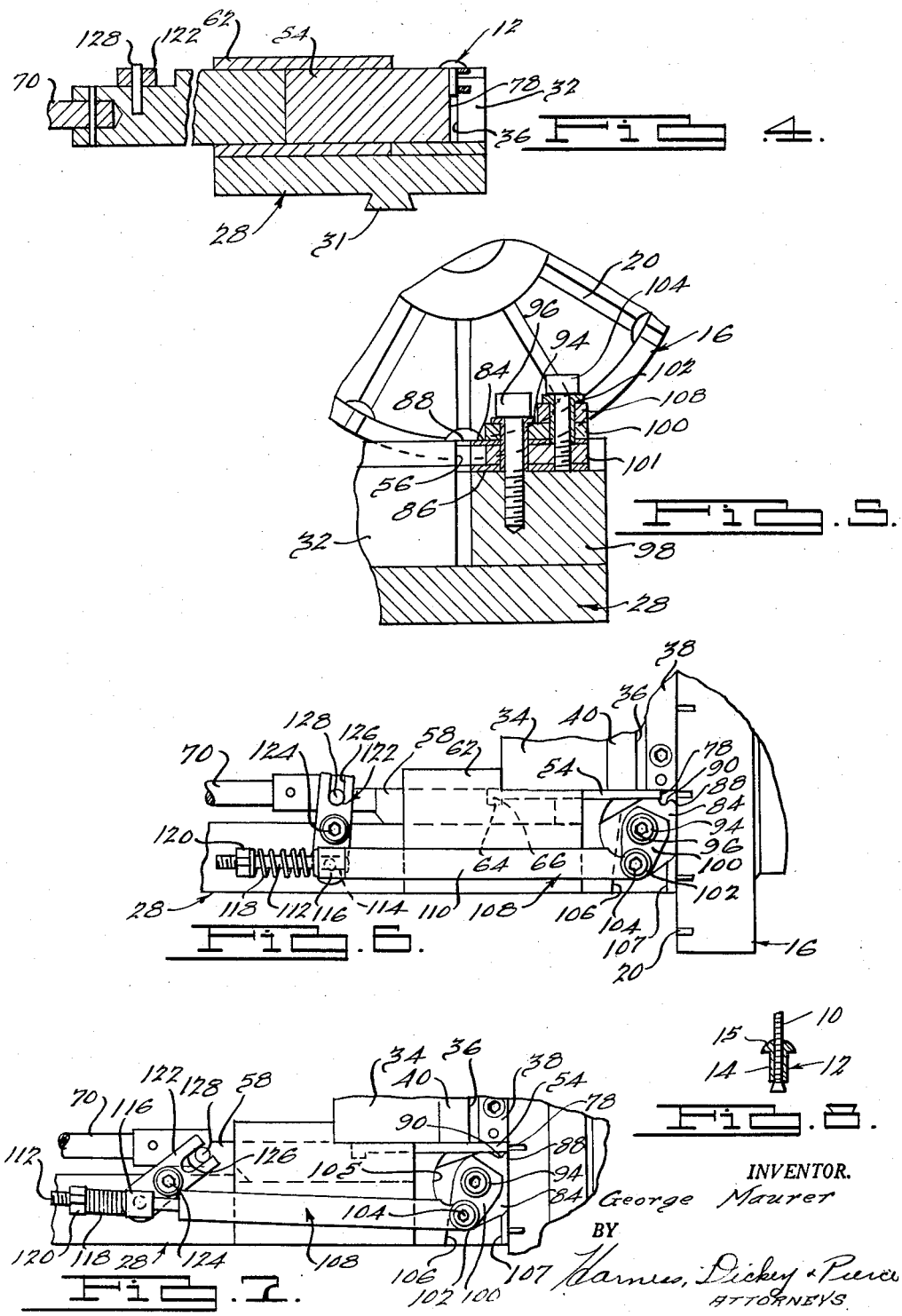

2,860,818
TRANSFER MECHANISM

George Maurer, Detroit, Mich., assignor to Huck Manufacturing Company, Detroit, Mich., a corporation of Michigan Application November 9, 1953, Serial No. 391,058

3 Claims. (Cl. 221—243)

This invention relates to transfer mechanisms and, more particularly, to an improved transfer mechanism for transferring workpieces from one location to another location.

An object of the invention is to overcome disadvantages in prior transfer mechanisms of the indicated character and to provide an improved transfer mechanism incorporating improved means for autorapidly transferring workpieces to a selected location with a minimum of labor and expense.

Another object of the invention is to provide an improved transfer mechanism incorporating improved means for preventing the clogging or jamming of workpieces in the mechanism during the operation thereof.

Another object of the invention is to provide an improved transfer mechanism that is durable, efficient and reliable in operation and which may be economically manufactured, assembled and installed with a minimum of expense.

Still another object of the invention is to provide an improved transfer mechanism that may be readily adapted to accommodate workpiece of various sizes and shapes.

The above as well as other objects and advantages of the present invention will become apparent from the following description, the appended claims and the accompanying drawings wherein:

Figure 1 is a perspective view of a transfer mechanism constructed in accordance with the present invention and showing the same installed on a fragmentarily illustrated automatic assembly machine;

Fig. 2 is an enlarged top plan view of the transfer mechanism illustrated in Fig. 1;

Fig. 3 is an enlarged sectional view of the structure illustrated in Fig. 2, taken on the line 3—3 thereof;

Fig. 4 is an enlarged sectional view of the structure illustrated in Fig. 2, taken on the line 4—4 thereof;

Fig. 5 is an enlarged sectional view of the structure illustrated in Fig. 2, taken on the line 5—5 thereof;

Fig. 6 is a fragmentary plan view similar to Fig. 2 but showing the transfer mechanism in another operative position;

Fig. 7 is a fragmentary top plan view similar to Fig. 2 but showing the transfer mechanism in still another operative position; and Fig. 8 is an elevational view of a workpiece.

Referring to the drawings, a preferred embodiment of the invention is shown incorporated in a transfer mechanism which is shown in installed relationship with respect to an automatic assembly machine of a known type for assembling blind rivets. As shown in Fig. 8, such rivets may include a pin 10 and a sleeve 12 having a cylindrical shank portion 14 and an enlarged collar portion 15. The details of the automatic assembly machine and the blind rivet form no part of the present invention and it will be understood that the present invention is applicable to other uses, the machine and workpieces being shown merely to typify an important use of the invention.

An automatic assembly machine of the type illustrated includes an indexing mechanism, generally designated 16, which is adapted to locate and hold the sleeves 12 of the blind rivets while a pin 10 is inserted into the bore of each sleeve by a reciprocating rod 17 powered by any suitable or conventional means. In assembling the blind rivets, the pins 10 are fed into the automatic assembly machine through a channel 18 and are positioned in coaxial alignment with the reciprocating rod 17. The indexing mechanism 16 defines a plurality of spaced, radially extending passageways 20, each adapted to carry a sleeve 12 of a blind rivet. When the indexing mechanism is operated, the passageways 20 are successively positioned in alignment with the reciprocating rod 17 and during the time that each passageway 20 is aligned with the rod 17, reciprocating movement is imparted to the rod so that the rod 17 forces one of the pins 10 into the bore of one of the sleeves 12 to complete the assembly of a blind rivet. As the mechanism 16 is successively indexed, the assembled rivets are removed from the passageways 20 by the action of the cam surfaces 22 and the assembled rivets fall into the bin 24.

The present invention provides a transfer mechanism, generally designated 26, for feeding and loading the sleeves 12 in the radially outer ends of the passageways 20 defined by the indexing mechanism 16. The transfer mechanism 26 includes a generally L-shaped base 28 having legs 29 and 30 integrally joined at the inner ends thereof. The base 28 may also be provided with a depending tenon 31 adapted to fit in a mortise and secure the transfer mechanism to the automatic assembly machine.

As shown in Fig. 2, an elongate guide block 32 is fixed to the base 28 adjacent one edge of the leg 30 while a guide block 34 is fixed to the same leg 30 in spaced relationship to the guide block 32 so that the guide block 32 and guide block 34 define a channel-shaped passageway 36 adapted to accommodate the shank portions 14 of the sleeves 12 while the collar portions 15 engage suitable wear plates 38 and 40 releasably secured to the guide blocks 32 and 34, respectively, by any suitable means, such as the screws 42.

In order that the sleeves 12 may be moved longitudinally along the passageway 36, a pair of spaced ducts 44 and 46 are provided in the guide block 34, the inner end portion of each of the ducts 44 and 46 communicating with the passageway 36 and the axes of the inner end portions of the ducts intersecting the longitudinal axis of the passageway 36 at an oblique angle. Compressed air is supplied to the outer end portions of the ducts 44 and 46 through supply tubes 48 and 50, threadably connected to the guide block 34, as at 52. The compressed air is discharged from the inner ends of the ducts 44 and 46 into the passageway 36 in the form of jets having sufficient velocity and pressure to cause the sleeves 12 to move longitudinally of the passageway 36 in side-by-side relationship.

For the purpose of transferring the sleeves 12 from the passageway 36 to the passageways 20 defined by the indexing mechanism 16, an elongate, substantially rectangular blade element 54 is mounted for reciprocation in an open end passageway 56 which intersects the passageway 36. The passageway 56 is of substantially the same width as the passageway 36, and the longitudinal axis of the passageway 56 is substantially perpendicular to the longitudinal axis of the passageway 36. The blade element 54 is actuated by a blade holder 58 which overlaps the blade element 54, the blade holder being mounted for reciprocation in a channel 60 defined by a guide member 62 fixed to the base 28 by any suitable means. The end portion of the blade holder 58 adjacent the blade element 54 is preferably reduced in width so that the overlapping portions of the blade element 54 and the blade holder 58 are of substantially the same width as the channel 60 and a notch 64 is provided in the blade holder 58 adapted to receive a transversely projecting flange 66 provided on the adjacent end of the blade element 54. With such a construction the blade element may be removed and repaired or replaced with a minimum of labor and expense when it becomes worn or otherwise unserviceable. The opposite end portion of the blade holder 58 is provided with an internally threaded aperture 68 adapted to threadably engage one end of a piston rod 70 actuated by a piston 72 housed in a conventional pneumatic cylinder 74. Compressed air is supplied to the cylinder 74 through a supply tube 76 to actuate the piston 72, the supply of air being controlled by any suitable or conventional valve means (not shown).

When the blade element 54 is in the retracted position illustrated in Fig. 2, the end 78 thereof is substantially co-planar with the wall 80 of the passageway 36 so that a single sleeve 12 may move from the passageway 36 into the passageway 56. When the blade element is in the extended position illustrated in Fig. 7, the end 78 of the blade element is positioned adjacent the open end of the passageway 56 and is substantially co-planar with the edge 82 of the guide block 32.

In order to insure that only one sleeve 12 will be positioned in the passageway 56 when the blade element 54 is actuated and to prevent clogging or jamming of the sleeves, a pair of spaced stop members 84 and 86 are provided each having an outwardly projecting tang 88 which extends across the passageway 56 with the edge 90 of each tang being substantially co-planar with the wall 92 of the passageway 36 when the blade element 54 is in the retracted position illustrated in Fig. 2. Each of the stop members 84 and 86 is fixed to a bushing 94 pivotally mounted on a pivot pin 96 which extends through the bushing 94 and threadably engages a mounting block 98 fixed to the base 28. One end of each of a pair of spaced link arms 100 and 101 is fixed to the bushing 94 and the opposite end of each of the link arms 100 and 101 is fixed to a bushing 102 pivotally mounted on a pivot pin 104 which extends through the bushing 102 and threadably engages the stop member 86 and link arm 101. The stop members 84 and 86 and the link arms 100 and 101 are positioned in a recess 105 defined by the mounting block 98, the recess 105 having side walls 106 and 107 which serve as abutment stops to limit the angular movement of the stop members 84 and 86 and the link arms 100 and 101.

For the purpose of actuating the stop members 84 and 86, an actuating arm 108 is provided having an elongate, substantially rectangular portion 110 and a substantially cylindrical portion 112 integral with the rectangular portion 110 and projecting longitudinally outwardly therefrom. One end of the actuating element 108 is pivotally connected to the bushing 102 while the cylindrical portion 112 of the actuating arm 108 projects through an aperture 114 in a post 116. A coil spring 118 is mounted on the cylindrical portion 112 of the actuating arm 108, one end of the coil spring bearing against the post 116 while the opposite end of the spring bears against a nut 120 which threadably engages the cylindrical portion 112. The post 116 is pivotally connected to one end of a link arm 122 and the central portion of link arm 122 is pivotally connected to the base 28 by a pivot pin 124 which extends through an aperture in the link arm 122 and threadably engages the base 28. The opposite end portion of the link arm 122 is generally U-shaped in plan view and defines an open-ended recess 126 adapted to accommodate a pin 128 fixed to the blade holder 58 at a position near, but spaced from, the end thereof adjacent the piston rod 70.

In the operation of the transfer mechanism of the present invention the components thereof are initially positioned in the manner illustrated in Fig. 2. The sleeves 12 of the blind rivets are fed into the passageway 36 by any suitable or conventional means and move longitudinally therealong toward the passageway 56 due to the action of the compressed air which passes through the ducts 44 and 46 and is discharged therefrom into the passageway 36 at sufficient velocity and pressure to maintain the sleeves 12 in side-by-side relationship. It will be noted that the duct 46 discharges into the passageway 36 at a position near the end thereof adjacent the passageway 56, thus insuring sufficient pressure to force a sleeve 12 into the passageway 56 when the blade element 54 and stop members 84 and 86 occupy the positions illustrated in Fig. 2. Compressed air is then forced into the cylinder 74 through the supply tube 76, thus causing the piston 72 and piston rod 70 to move to the right, as viewed in Figs. 2, 6 and 7. The piston rod 70 forces the blade holder 58 and blade element 54 to move longitudinally of the channel 60 and passageway 56, respectively, so that the end 78 of the blade element 54 engages the shank 14 of the adjacent sleeve 12 and causes such sleeve to move longitudinally of the passageway 56. When the blade holder 58 is actuated, the pin 128 positioned in the recess 126 of the link arm 122 causes the link arm 122 to pivot about the axis of the pivot pin 124 in a clockwise direction, as viewed in Figs. 2, 6 and 7, thus causing the post 116 to bear against the spring 118. The force required to compress the spring 118 is greater than the force required to pivot the actuating arm 108 about the pivot pin 104 and the link arms 100, 101 and stop members 84 and 86 about the pivot pin 96 so that the force applied to the spring 118 by the post 116 is transmitted through the spring to the nut 120 and the actuating arm 108, thus causing the actuating arm 108 to move to the left, as viewed in Figs. 2 and 6. The movement of the actuating arm 108 causes the link arms 100 and 101 and the stop members 84 and 86 to pivot about the axis of the pin 96, thus moving the tangs 88 out of the passageway 56 and enabling the blade element 54 to move a sleeve 12 longitudinally of the passageway 56 toward the open end thereof adjacent the indexing mechanism 16. The link arms and stop members continue to pivot about the axis of the pin 96 until the link arm 101 abuts the wall 106 of the mounting block 98 to halt the pivotal movement of the stop members 84 and 86. As the piston 72, piston rod 70, blade holder 58 and blade element 54 continue to move to the right, the link arm 122 continues to pivot about the axis of the pivot pin 124 in a clockwise direction. Since the actuating arm 108 is not free to move, the post 116 compresses the spring 118 and slides longitudinally of the cylindrical portion 112 of the actuating arm 108, while the pin 128 slides outwardly in the recess 126 of the link arm 122, thus permitting the blade element 54 to continue its travel to the end of the passageway 56 so as to force a sleeve 12 into the adjacent passageway 20 in the indexing mechanism 16. Any suitable or conventional means may be provided for synchronizing the travel of the piston 72 with the angular movement of the indexing mechanism 16 so that a passageway 20 will be positioned adjacent the passageway 56 when the blade element 54 reaches the extended position.

When the piston 72 reverses its direction of travel, the link arm 122 pivots in a counterclockwise direction about the pivot pin 124 so that the previously compressed spring 118 forces the post 116 along the cylindrical portion 112 of the actuating arm 108 until the post 116 engages the adjacent end of the rectangular portion 110 of the actuating arm. As the link arm 122 continues to pivot in a counterclockwise direction, due to the action of the pin 128, the post 116 is forced against the actuating arm 108 and the actuating arm 108 in turn pivots the link arms 100 and 101 and the stop members 84 and 86 about the axis of the pivot pin 96 with the result that the tangs 88 move into the passageway 56. The angular movement of the stop members 84 and 86 continues until the link arm 101 abuts the wall 107 of the stop member. The stop members 84 and 86 then occupy the positions illustrated in Fig. 2 so that the tangs 88 prevent the entrance of more than one sleeve 12 into the passageway 56 when the blade element 54 is in the retracted position.

While a preferred embodiment of the invention has been shown and described, it will be understood that various changes and modifications may be made without departing from the spirit of the invention.

What is claimed is:

1. In a transfer mechanism, the combination comprising a supporting structure, guide means fixed to said supporting structure and defining a passageway adapted to receive a workpiece, means for successively feeding workpieces into said passageway, stop means limiting the movement of a workpiece in said passageway, reciprocating means including a movable element slidably mounted in said passageway and actuable to engage said workpiece and move said workpiece longitudinally of said passageway, and means operable in response to the movement of said reciprocating means to disengage said stop means, said disengaging means including an elongate actuating arm extending in spaced substantially parallel relationship to said element and movable in a direction substantially parallel to the direction of movement of said element, means connecting one end portion of said actuating arm to said stop means, a link arm pivotally connected to said supporting structure intermediate said element and said actuating arm, one end portion of said link arm being connected to said actuating arm for combined pivotal and sliding movement, the other end portion of said link arm being connected to said element for combined pivotal and sliding movement, resilient means opposing the sliding movement of said link arm relative to said actuating arm, the forces exerted by said resilient means being greater than the forces required to move said actuating arm to disengage said stop means, and means for positively stopping the movement of said actuating arm after said actuating arm has moved a predetermined distance while permitting said element to continue to move whereby upon continued movement of said element, the forces applied to said element to effect movement thereof are transmitted through said link arm to overcome the forces exerted by said resilient means so that sliding movement of said link arm relative to said actuating arm is permitted.

2. A transfer mechanism for successively feeding workpieces comprising, in combination, a supporting structure, guide means carried by said supporting structure and defining a pair of intersecting passageways each adapted to guide said workpieces in a predetermined direction, a movable element slidably mounted in one of said passageways for reciprocating movement in a direction substantially parallel to the longitudinal axis of said one passageway, means for actuating said element, means for successively feeding workpieces into said one passageway from the other of said passageways, a stop member pivotally connected to said supporting structure and having an abutment portion projecting into said one passageway to limit the movement of a workpiece therein, and means operable in response to the movement of said element for imparting rotary motion to said stop member to move said abutment portion to an inoperative position, said last mentioned means including an elongate actuating arm extending in spaced substantially parallel relationship to said element and movable in a rectilinear direction substantially parallel to the direction of movement of said element, means pivotally connecting one end portion of said actuating arm to said stop member, a link arm pivotally connected to said supporting structure at a position intermediate said actuating arm and said element, one end portion of said link arm being connected to said actuating arm for combined pivotal and sliding movement relative to said actuating arm, the other end portion of said link arm being connected to said element for combined pivotal and sliding movement, spring means carried by said actuating arm and opposing the sliding movement of said link arm relative to said actuating arm, the forces exerted by said spring means being greater than the forces required to move said actuating arm to effect movement of said abutment portion to said inoperative position, and means for positively stopping the movement of said actuating arm after said actuating arm has moved a predetermined distance while permitting said element to continue to move whereby upon continued movement of said element, the forces applied to said element to effect movement thereof are transmitted through said link arm to overcome the forces exerted by said spring means so that sliding movement of said link arm relative to said actuating arm is permitted.

3. In combination with a work holding device adapted to receive and hold a workpiece, a transfer mechanism for loading said device, said transfer mechanism including a supporting structure, guide means fixed to said supporting structure and defining a pair of intersecting passageways each adapted to receive a workpiece for longitudinal movement therealong, means for successively feeding workpieces into one of said passageways from the other of said passageways, stop means limiting the movement of workpieces in said one passageway, reciprocating means including a movable element slidably mounted in said one passageway and actuable to engage a said workpiece and move said workpiece longitudinally of said passageway, and disengaging means operable in response to the movement of said reciprocating means to disengage said stop means, said disengaging means including an elongate actuating arm extending in spaced substantially parallel relationship to said element and movable in a direction substantially parallel to the direction of movement of said element, means connecting one end portion of said actuating arm to said stop means, a link arm pivotally connected to said supporting structure, one end portion of said link arm being connected to said actuating arm for combined pivotal and sliding movement, the other end portion of said link arm being connected to said element for combined pivotal and sliding movement, resilient means opposing the sliding movement of said link arm relative to said actuating arm, the forces exerted by said resilient means being greater than the forces required to move said actuating arm to disengage said stop means, and means for positively stopping the movement of said actuating arm after said actuating arm has moved a predetermined distance while permitting said element to continue to move whereby upon continued movement of said element, the forces applied to said element to effect movement thereof are transmitted through said link arm to overcome the forces exerted by said resilient means so that sliding movement of said link arm relative to said actuating arm is permitted.

References Cited in the file of this patent

UNITED STATES PATENTS

| | | |
|---|---|---|
| 828,682 | Rodd | Aug. 14, 1906 |
| 1,133,602 | Woodland | Mar. 30, 1915 |
| 1,330,073 | Grover | Feb. 10, 1920 |
| 2,355,311 | Linkner | Aug. 8, 1944 |
| 2,525,305 | Lombard | Oct. 10, 1950 |
| 2,525,765 | Betge | Oct. 17, 1950 |
| 2,570,660 | Gamble | Oct. 9, 1951 |

FOREIGN PATENTS

| | | |
|---|---|---|
| 459,948 | Germany | May 16, 1928 |